UNITED STATES PATENT OFFICE.

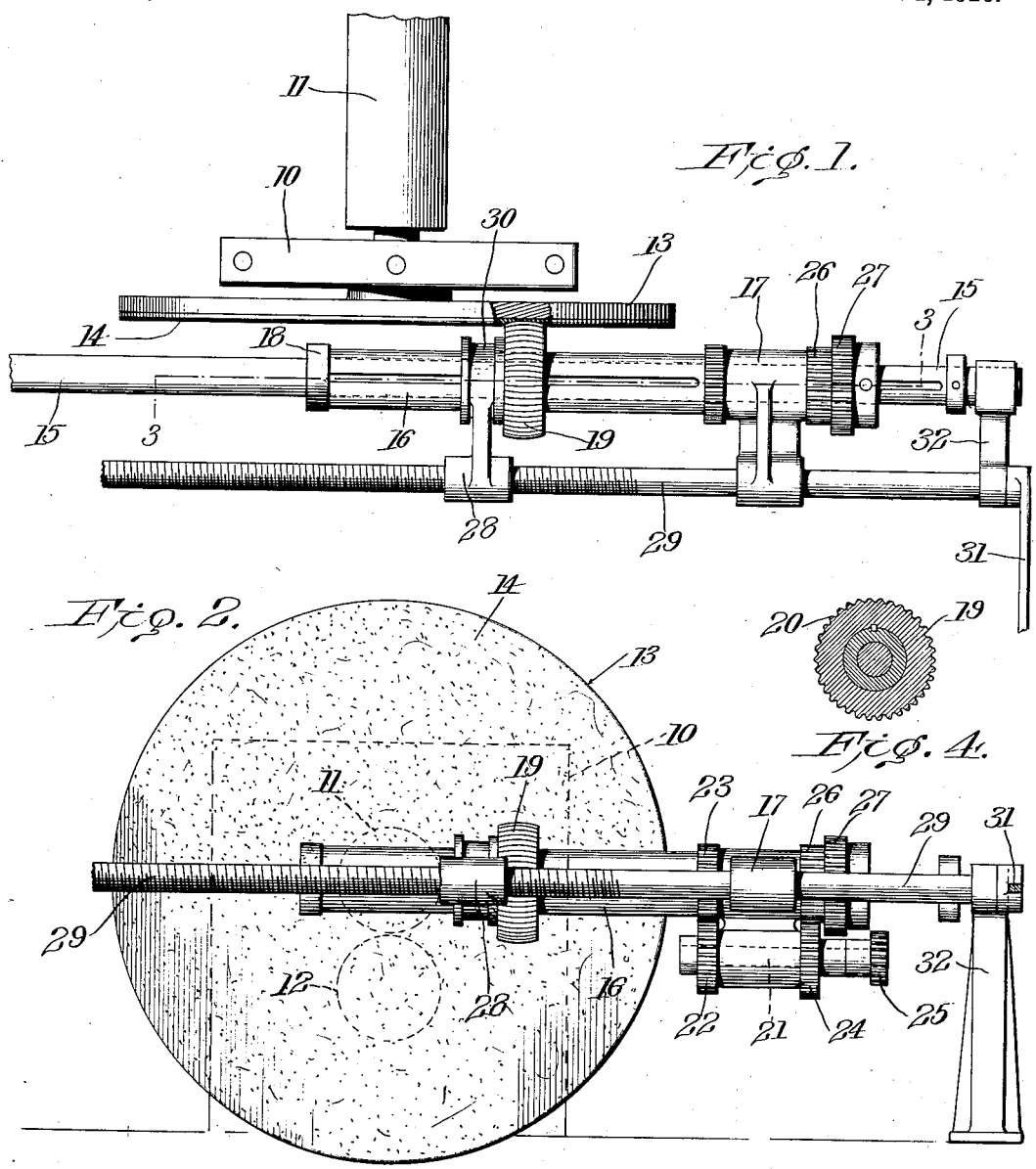

FRANK M. JOSLIN, OF AMSTERDAM, NEW YORK, ASSIGNOR TO INMAN MANUFACTURING COMPANY, INC., OF AMSTERDAM, NEW YORK, A CORPORATION OF NEW YORK.

GEARING.

1,251,784.  Specification of Letters Patent.  Patented Jan. 1, 1918.

Application filed October 12, 1914. Serial No. 866,371.

*To all whom it may concern:*

Be it known that I, FRANK M. JOSLIN, a citizen of the United States, and resident of Amsterdam, county of Montgomery, State of New York, have invented certain new and useful Improvements in Gearing, of which the following is a specification.

This invention relates to variable speed drives and more particularly to drives adapted to be used in machines for manufacturing paper boxes for unwinding the paper from the rolls.

One of the objects of the invention is to provide a substantially positive drive capable of minute variations in speed ratio. Another object is to provide a drive, of the type comprising a disk wheel with a smaller wheel movable across the face thereof, to vary the speed ratio, which is capable of a wider variation in the speed ratio, than can ordinarily be obtained, without increasing the diameter of the disk wheel or reducing the diameter of the wheel coöperating with the disk wheel.

The novel features of the invention will be apparent from the following description taken in connection with the accompanying drawing in which, Figure 1 is a plan view of a drive embodying my invention.

Fig. 2 is a side elevation thereof.

Fig. 3 is a section on the line 3—3 of Fig. 1.

Fig. 4 is a section on the line 4—4 of Fig. 3.

Referring to the drawings, 10 indicates a bearing housing in which are arranged the bearings for a pair of feed rolls 11 and 12. The shaft of one of the rolls, preferably the roll 11, has secured thereon a disk wheel 13 having a facing of an elastic self-healing composition 14 such as a suitable grade of rubber. Arranged parallel with the face of the wheel 13 and preferably on the axis of the wheel is a shaft 15 which is supported in suitable bearings and has loosely arranged thereon a sleeve 16, this sleeve being held against endwise movement by a bracket 17 and a collar 18. Splined on the sleeve 16 is a toothed wheel 19 which is so arranged that the teeth 20 thereof are embedded in the facing 14 of the wheel 13.

The bracket 17 carries a countershaft 21 and a gear wheel 22 is secured on this countershaft and meshes with a gear 23 on the sleeve 16. The countershaft 21 also has secured thereon the spaced gears 24 and 25 and a pair of gears 26 and 27, which are secured together and splined on the shaft 15, are adapted to mesh with the gears 24 and 25 respectively.

The toothed wheel 19 is moved radially on the wheel 13 by means of a yoke 28 which is mounted on a screw threaded rod 29 and engages the grooved hub 30 of the wheel 19. From Fig. 1 it will be evident that by rotating the rod 29, by means of the handle 31, the wheel 19 will be caused to travel to or from the axis of the wheel 14, depending upon the direction in which the rod 29 is rotated. The rod 29 may be supported in any suitable manner and for this purpose I have shown at one end of the rod a bracket 32, the support for the opposite end of the rod being omitted.

On account of the teeth of the wheel 19 being embedded in the facing 14 of the wheel 13, it will be evident that at the point of contact the teeth 20 will mesh with the corrugations which are formed in the facing 14 by the teeth 20 so that a practically positive driving connection is formed between the wheel 19 and the wheel 13. The teeth 20 extend in the direction of the axis of this wheel and are convexly curved longitudinally and therefore they do not interfere with the movement of the wheel toward and from the axis of the wheel 13. With the gears 24 and 26 in mesh, as shown in Fig. 2, it will be evident that the sleeve 16 may be driven from the shaft 15 at a given speed ratio. When the gear 27 is moved into mesh with the gear 25, it will be evident that the sleeve 16 will be driven at another speed without varying the speed of the shaft 15. The proportions of these gears are such that the sleeve 16 will be driven at substantially twice the speed when gears 25 and 27 are in mesh as when the gears 24 and 26 are in mesh so that this speed changing mechanism taken in connection with the wheels 13 and 19 enables the rolls 11 and 12 to be operated at speeds which vary through wide limits and the effect of the gearing is to provide for changes in speed of the rolls 11 and 12 with a comparatively small disk 13 as wide as could be obtained with the wheel 19 and a disk twice the diameter of that shown, and without using the change speed gears.

Having described my invention what I claim and desire to secure by Letters-Patent is, 1. In a variable speed device, the combination of a disk wheel, a driving shaft arranged with its axis at right angles to the axis of the disk wheel, a sleeve rotatably mounted on said shaft and secured against axial movement, a wheel slidingly splined on said sleeve and adapted to coöperate with said disk, and means for connecting said shaft and sleeve to rotate at any one of a plurality of angular velocity ratios.

2. In a variable speed device, the combination of a disk wheel, a driving shaft arranged with its axis at right angles to the axis of the disk wheel, a sleeve rotatably mounted on said shaft and secured against axial movement and carrying a gear fast therewith and a wheel slidingly splined thereto adapted to coöperate with said disk, a countershaft, a gear secured to said countershaft and meshing with the gear on the sleeve, other gears of different diameters secured on said countershaft, a plurality of gears of varying diameters slidingly splined to the driving shaft and any one of which is adapted to be selectively engaged with a complemental gear on the countershaft.

3. In a variable speed drive for unwinding paper from rolls, the combination with a pair of feed rolls, of a disk wheel for driving said rolls, a driving shaft arranged with its axis at right angles to the axis of the disk wheel, a sleeve rotatably mounted on said shaft and secured against axial movement and carrying a gear fast therewith and a wheel slidingly splined thereto adapted to coöperate with said disk, a countershaft, a gear secured to said countershaft and meshing with the gear on the sleeve, other gears of different diameters secured on said countershaft, a plurality of gears of varying diameters slidingly splined to the driving shaft and any one of which is adapted to be selectively engaged with a complemental gear on the countershaft.

4. In a variable speed drive for unwinding paper from rolls thereof, the combination with a pair of feed rolls, of a wheel for driving said rolls having a facing of elastic material, a wheel arranged at right angles to the first mentioned wheel and having teeth on its periphery extending in an axial direction and arranged to embed themselves in said material, and means for moving the second mentioned wheel to and from the axis of the first mentioned wheel to vary the speed ratio, the teeth of said second wheel being convexly curved longitudinally to facilitate adjustment on said elastic facing.

In testimony whereof I affix my signature in presence of two witnesses.

FRANK M. JOSLIN.

Witnesses:
JAMES W. FERGUSON,
RALPH A. WOOD.